US012399856B2

United States Patent
Bögli et al.

(10) Patent No.: US 12,399,856 B2
(45) Date of Patent: Aug. 26, 2025

(54) SERIAL INTERFACE FOR CONTAINERS

(71) Applicant: Siemens Schweiz AG, Zürich (CH)

(72) Inventors: Daniel Bögli, Steinhausen (CH); Andreas Schirm, Oberägeri (CH)

(73) Assignee: SIEMENS SCHWEIZ AG, Zurich (CH)

( * ) Notice: Subject to any disclaimer, the term of this patent is extended or adjusted under 35 U.S.C. 154(b) by 22 days.

(21) Appl. No.: 18/450,270

(22) Filed: Aug. 15, 2023

(65) Prior Publication Data

US 2024/0070103 A1 Feb. 29, 2024

(30) Foreign Application Priority Data

Aug. 25, 2022 (EP) .................................. 22192189

(51) Int. Cl.
*G06F 13/40* (2006.01)
*G06F 13/42* (2006.01)

(52) U.S. Cl.
CPC ...... *G06F 13/4068* (2013.01); *G06F 13/4282* (2013.01); *G06F 2213/40* (2013.01)

(58) Field of Classification Search
CPC .................................................. G06F 16/955
See application file for complete search history.

(56) References Cited

U.S. PATENT DOCUMENTS

| 7,018,242 B2* | 3/2006 | Brown | H01R 31/06 439/676 |
| 7,724,752 B1* | 5/2010 | Shen | H04L 61/2567 370/328 |
| 2022/0247725 A1* | 8/2022 | Panchamia | H04L 12/4633 |

OTHER PUBLICATIONS

Anonymous: "Docker Architecture", pp. 1-2, XP093016573, Retrieved from the Internet: URL:https://web.archive.org/web/20181127084805/ https://www.tutorialspoint.com/docker/docker_architecture.htm [retrieved on Jan. 23, 2023], Nov. 27, 2018.

(Continued)

*Primary Examiner* — Henry Tsai
*Assistant Examiner* — Juanito C Borromeo
(74) *Attorney, Agent, or Firm* — Slayden Grubert Beard PLLC

(57) ABSTRACT

A networking device (e.g. edge gateway), configured to host containers to provide application services, for converting data between an IP-Port of the networking device and a serial communication link to enable serial communication between the networking device and a serial interface of a device (e.g. controller, actor, sensor).

12 Claims, 3 Drawing Sheets

(56) References Cited

OTHER PUBLICATIONS

Anonymous: "How to expose host serial port to container correctly?—Docker Forums", pp. 1-4, XP093016120, Retrieved from the Internet: URL:https:// web.arch ive. org/web/20200614062246/https ://forums.docker. com/t/how-to-expose-host-serial-port-to-contai ner-correctly/81588/5[retrieved on Jan. 20, 2023], Jun. 14, 2020.
Anonymous: Docker Compose specification—Docker Documentation, pp. 1-38, XP093016150, Retrieved from the Internet: URL:https:// web.archive.org/web/20220824205134/https://docs.docker.com/compose/compose-file/ [retrieved on Jan. 20, 2023], Aug. 24, 2022.
Hirofuchi, Takahiro et al., "USB/IP A Peripheral Bus Extension for Device Sharing Over IP Network," FREENIX Track: 2005 USENIX Annual Technical Conference, USENIX Association, pp. 47-60, Jan. 1, 2005.
McMorran, Ben, "Connecting USB Devices to WSL," URL: https://devblogs.microsoft.com/commandline/connecting-usb-devices-to-wsl/, 4 pages, Nov. 4, 2021.
European Office Action, Application No. 22192189.3, 6 pages, Jun. 4, 2025.

\* cited by examiner

SERIAL INTERFACE FOR CONTAINERS

CROSS-REFERENCE TO RELATED APPLICATIONS

This application claims priority to EP Application No. 22192189.3 filed Aug. 25, 2022, the contents of which are hereby incorporated by reference in their entirety.

TECHNICAL FIELD

The present disclosure relates to networks. Various embodiments of the teachings herein include networking devices configured to host containers to provide application services and/or methods for providing a serial communication link for containers configured to communicate via IP-protocols.

BACKGROUND

In Building-Automation it is common to use serial interface for communication between devices. In modern IT (Information Technology) environments serial interfaces are no longer used and are not very well supported. Nowadays gateways or cloud edge gateways are often based on modern container technology. Applications or services run in containers. Containers run in isolation from the host operating system (OS). Containers therefore have no direct access to hardware resources for security reasons. The container technology originates from datacenters, therefore granting access to serial interfaces is absent. The communication between containers is done via IP (Internet protocol, e.g. IPv4 or IPv6).

A container is a software module that packages up code and all its dependencies, so the respective applications or services run quickly and reliably within the IT-Environment. Typically, a container image is a standalone, executable package of software which comprises everything needed to run an application or a service: code, runtime, libraries, tools, and respective settings. Container images may become containers at runtime.

OS-level virtualization is an operating system (OS) paradigm which supports the deployment of container technology.

In Building-Automation there is the need to run applications or services in containers and give them access to devices which are communicating with serial interfaces and protocols.

SUMMARY

The teachings of the present disclosure include serial communication links to containers in an IT-Environment. For example, some embodiments include a networking device (e.g. gateway, edge gateway), configured to host containers to provide application services, the networking device comprising: an operating system (e.g. Linux) to provide computing resources for the containers; a runtime system (e.g. Docker runtime system) providing an environment to run the containers on the networking device; at least one container providing an application and/or a service for a device (e.g. actor, sensor, controller) communicating with the network device, wherein the at least one container comprises an application-specification for the respective application or service, the application-specification states which containers have to be installed and started on the networking device to provide the respective application or service, and wherein the application-specification including tags to indicate if the at least one container requires a serial communication link to the device (e.g. actor, sensor, controller) to provide the respective application and/or service to the device; wherein the operating system is providing and hosting a service for converting data between an IP-Port of the networking device and the serial communication link to the device.

As another example, some embodiments include a method for providing a serial communication link for containers configured to communicate via IP-protocols, the containers hosted on a networking device, the method comprising: providing an application specification to the networking device, the application specification stating which containers have to be installed and started on a runtime system of the networking device, the application-specification further including tags indicating whether a container requires serial communication to perform an application described in the application specification, wherein the tags including the respective serial protocol; assigning serial (physical) ports of the networking device to the containers used for serial communication; starting a converting service in the operating system of the networking device to translate between the serial protocol and IP-protocol, wherein the converting service is configured to bind the respective serial ports and the respective IP port (e.g. "well-known" or registered port) together for running in the runtime system; configuring the application-specification with the assigned serial port and the respective IP-protocol (e.g. IPv4, IPv6); and restarting the applications or triggering the applications to read in the application-specification which IP-Port is to be used to communicate via the serial communication link attached to a respective device.

BRIEF DESCRIPTION OF THE DRAWINGS

The above-mentioned and other concepts taught by the present disclosure are addressed with reference to the drawings of example embodiments. The shown embodiments are intended to illustrate, but not to limit the scope of the disclosure. The drawings contain the following figures, in which like numbers refer to like parts throughout the description and drawings and wherein.

DETAILED DESCRIPTION

In Building-Automation it is common to use serial interface for communication between devices. Therefore, in Building-Automation systems there a need to run applications or services in containers and give them access to devices which are communicating with serial interfaces and protocols. For example, an application provided by a container needs to communicate with a controller. This controller is connected to the device hosting the container via a serial connection. As a protocol, Modbus may be used.

Figure 1:
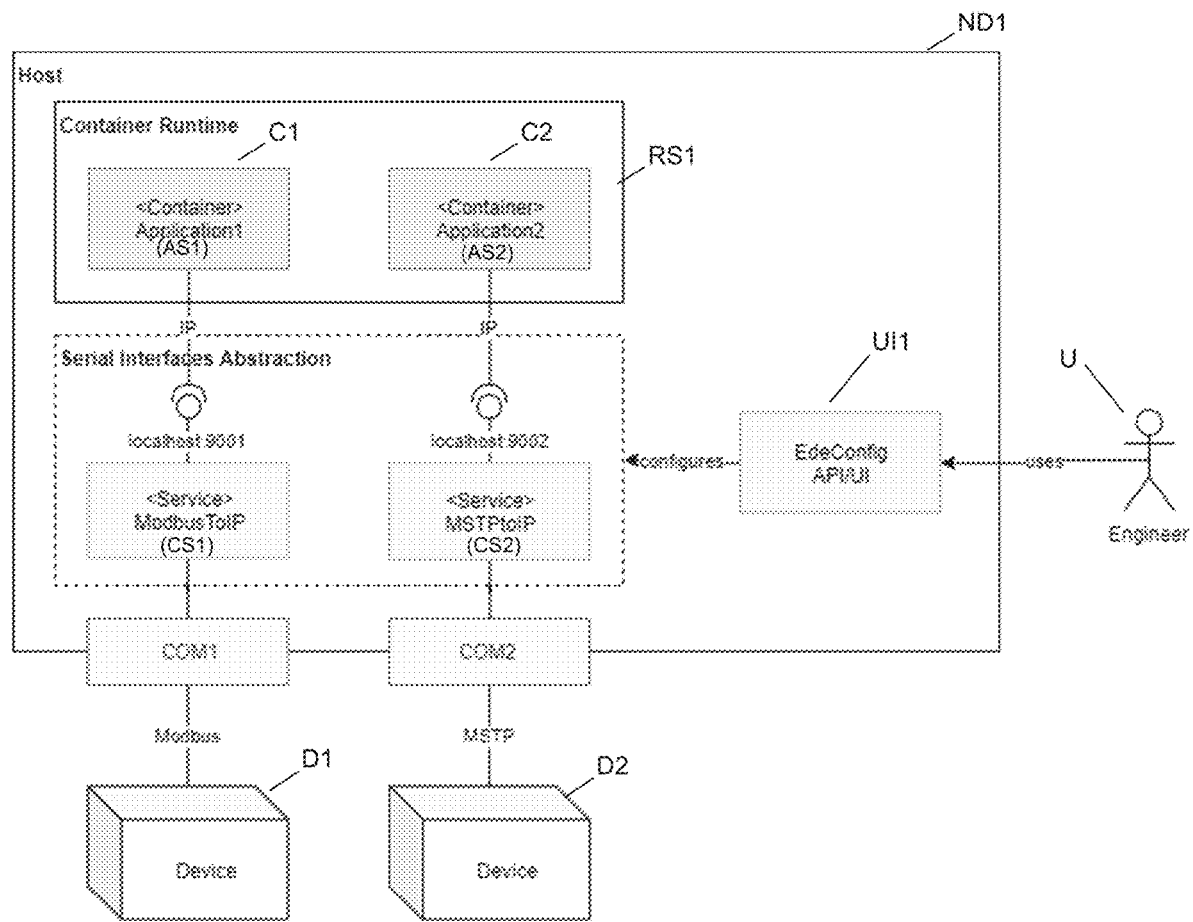
FIG. 1 illustrates a first exemplary networking device incorporating teachings of the present disclosure, configured to host containers to provide application services.

FIG. 1 illustrates a first exemplary networking device ND1 incorporating teachings of the present disclosure, configured to host containers C1, C2 to provide application services AS1, AS2, the networking device comprising:

an operating system (e.g. Linux) to provide computing resources for the containers C1, C2;

a runtime system RS1 (e.g. Docker runtime system) providing an environment to run the containers on the networking device;

at least one container C1, C2 providing an application and/or a service for a device D1, D2 (e.g. actor, sensor, controller) communicating with the network device ND1, wherein the at least one container C1, C2 comprises an application-specification for the respective application or service, the application-specification states which containers C1, C2 have to be installed and started on the networking device ND1 to provide the respective application or service, and wherein the application-specification including tags to indicate if the at least one container C1, C2 requires a serial communication link to the device D1, D2 (e.g. actor, sensor, controller) to provide the respective application and/or service to the device D1, D2; and wherein the operating system is providing and hosting a service CS1 (ModbusToIP), CS2 (MSTPtoIP) for converting data between an IP-Port (e.g. "well-known" or registered port) of the networking device ND1 and the serial communication link to the device D1, D2.

The exemplary networking device ND1 can be a gateway, an edge gateway, or a cloud edge gateway (providing connection or communication to a cloud infrastructure). The exemplary networking device ND1 is hosting the containers C1, C2 and providing a runtime system RS1 to run the containers C1, C2.

In some embodiments, the containers C1, C2 are lightweight, the networking device ND1 can run several containers simultaneously.

A service converts between the serial protocol and the IP protocol. This service is protocol specific and runs as a service of the host Operating System (see FIG. 2; OS). This service binds to an IP-Port on the host device ND1. Incoming our outgoing data is forwarded between the serial port and the IP port. Since implementation of this service is protocol specific, the character or frame detection can be specified by the needs of the concrete serial protocol. Containers can connect to this IP-Port and communicate via IP protocol to the serial port. The assignment of IP-ports (therefore the serial ports) to the containers C1, C2 can be performed by an engineer U (e.g. user) via a local web user interface UI1 (e.g. EdgeConfig API/UI).

In the illustration of FIG. 1, container C1 is providing a serial interface COM1 to communicate with device D1 via Modbus protocol. Container C2 is providing a serial interface COM2 to communicate with device D2 via MSTP (Multiple Spanning Tree Protocol) protocol.

In some embodiments, the networking device ND1 comprises an interface UI1 (API/UI) to assign physical ports of the device D1, D2 to the at least one container C1, C2. The interface UI1 can be a local web user interface (EdgeConfig API/UI) for a respective user U (e.g. engineer, developer). The exemplary networking device ND1 can be a controller, or a gateway, or an edge gateway, or a cloud edge gateway.

In the illustration according to FIG. 1, the devices D1, D2 can be controller, or actors, or sensors, or other devices connected to the networking device ND1. In some embodiments, the networking device ND1 is configured to provide OS-level virtualization for running the containers C1, C2 in the operating system (OS, see FIG. 2) of the networking device ND1.

According to Wikipedia:

"OS-level virtualization is an operating system (OS) paradigm in which the kernel allows the existence of multiple isolated user space instances, called containers (LXC, Solaris containers, Docker, Podman), zones (Solaris containers), virtual private servers (OpenVZ), partitions, virtual environments (VEs), virtual kernels (DragonFly BSD), or jails (FreeBSD jail or chroot jail). [1] Such instances may look like real computers from the point of view of programs running in them. A computer program running on an ordinary operating system can see all resources (connected devices, files and folders, network shares, CPU power, quantifiable hardware capabilities) of that computer. However, programs running inside of a container can only see the container's contents and devices assigned to the container. On Unix-like operating systems, this feature can be seen as an advanced implementation of the standard chroot mechanism, which changes the apparent root folder for the current running process and its children. In addition to isolation mechanisms, the kernel often provides resource-management features to limit the impact of one container's activities on other containers. Linux containers are all based on the virtualization, isolation, and resource management mechanisms provided by the Linux kernel, notably Linux namespaces and cgroups".

The services CS1 (ModbusToIP) or CS2 (MSTPtoIP) for converting data between an IP-Port of the networking device ND1 and the serial communication link to the devices D1, D2 can be implemented as a protocol converter for translating and/or transforming data between IP-Protocols and serial interfaces, e.g. Modbus to IP or MSTP to IP.

Figure 2:
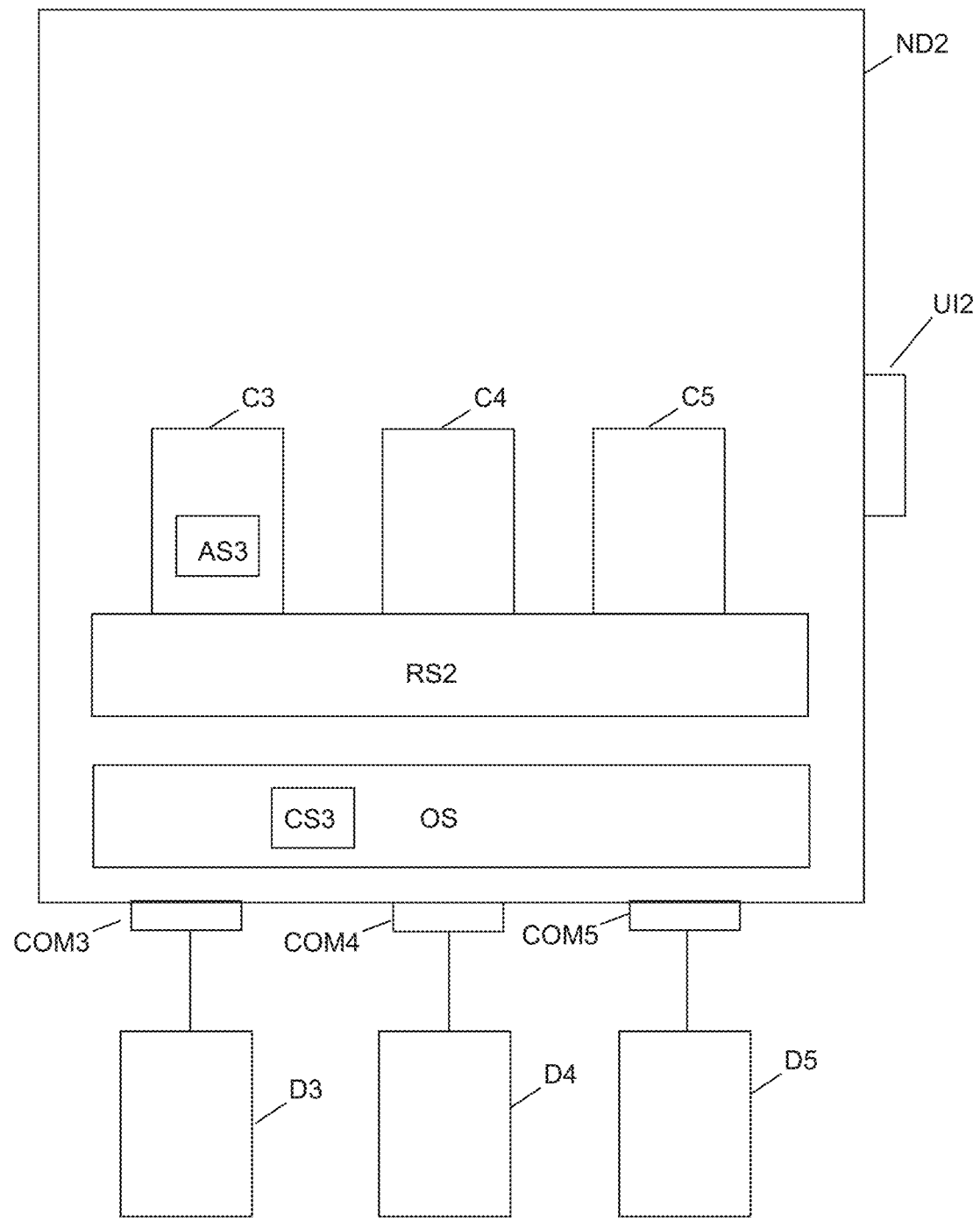
FIG. 2 illustrates a second exemplary networking device incorporating teachings of the present disclosure, configured to host containers to provide application services.

FIG. 2 illustrates a second exemplary networking device ND2 incorporating teachings of the present disclosure, configured to host containers C3-C5 to provide application services AS3, the networking device ND2 comprising:

an operating system OS (e.g. Linux, Unix) to provide computing resources for the containers C3-C5;

a runtime system RS2 (e.g. Docker runtime system) providing an environment to run the containers C3-C5 on the networking device ND2; and at least one container C3-C5 providing an application and/or a service AS3 for a device D3-D5 (e.g. actor, sensor, controller) communicating with the network device ND2, wherein the at least one container C3-C5 comprises an application-specification for the respective application or service, the application-specification states which containers C3-C5 have to be installed and started on the networking device ND2 to provide the respective application or service AS3, and wherein the application-specification including tags to indicate if the at least one container C3-C5 requires a serial communication link COM3-COM5 to the device D3-D5 (e.g. actor, sensor, controller) to provide the respective application and/or service AS3 to the device D3-D5;

wherein the operating system OS is providing and hosting a service CS3 for converting data between an IP-Port of the networking device and the serial communication link COM3-COM5 to the device D3-D5.

A service of the operating system OS converts between the serial protocol and the IP protocol. This service is protocol specific and runs as a service of the host Operating System OS. This service binds to an IP-Port on the host device ND2. Incoming our outgoing data is forwarded between the serial port and the IP port. Since implementation of this service is protocol specific, the character or frame detection can be specified by the needs of the concrete serial protocol. Containers can connect to this IP-Port and communicate via IP protocol to the serial port.

Exemplary scenario for implementation of the teachings of the present disclosure:

1. An application-specification AS3 is installed on the networking device ND2. The application-specification AS3 controls which containers C3-C5 should be installed and started on the networking device ND2. The application-specification AS3 includes tags to indicate if the application, respectively the container C3 C5 requires serial communication. The tag includes also the requested serial protocol, e.g. Modbus.

2. The commissioning engineer assigns with help of the configuration UI2 the physical ports to containers C3-C5. The UI2 will use the tags in the application-specification AS3 to show only containers C3-C5 which require serial communication.

3. The host, i.e the networking device ND2, starts the required services to translate between the serial protocol and IP protocol. The protocol specific service is started and configured to use a serial port and an IP port to bind to.

4. The host, i.e the networking device ND2, updates the application-specification AS3 with the assigned serial port and protocol.

5. The applications or services are restarted. The applications or services read from the application-specification AS3 which IP-Port it can use (eg. 9001 for COM3).

6. The applications or services can now communicate with the devices D3-D5 attached to the respective serial port.

This scenario offers serial communication for containers C3-C5 on the networking device ND2 in a generic way.

The assignment of IP-ports (therefore the serial ports) to the containers C3-C5 can be performed via a local web user interface UI2 (e.g. EdgeConfig API/UI). The exemplary networking device ND2 can be a controller, or a gateway, or an edge gateway, or a cloud edge gateway. Typically, a gateway provides the connection between two networks. The two networks can have different communication protocols.

Networking devices ND2 are electronic devices which are used for communication and/or interaction between devices in an IT-network environment and/or between devices in different networks.

In the illustration according to FIG. 2, the devices D3-D5 can be controllers, or actors, or sensors, or other devices connected to the networking device ND2.

Figure 3:
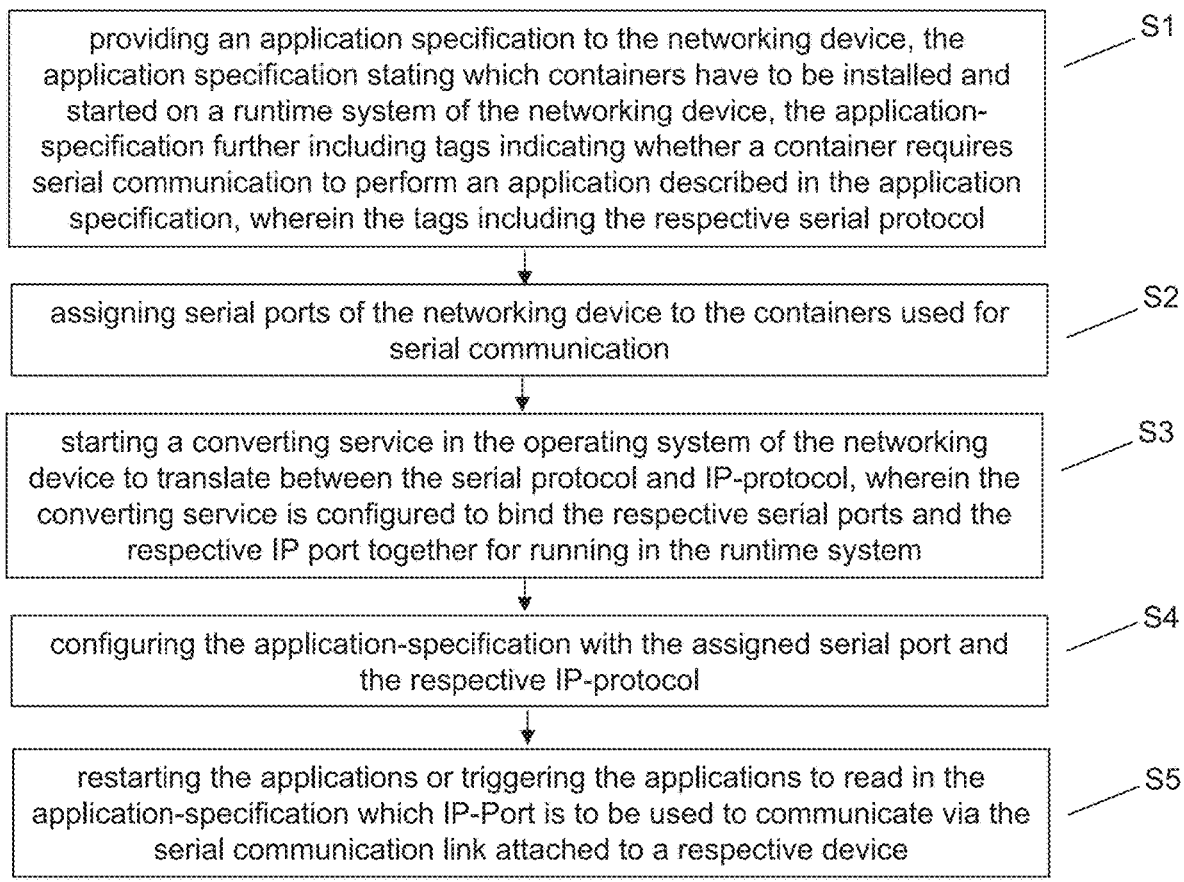
FIG. 3 illustrates an exemplary flowchart of a method for providing a serial communication link for containers configured to communicate via IP-protocols incorporating teachings of the present disclosure.

FIG. 3 illustrates an exemplary flowchart of a method for providing a serial communication link for containers configured to communicate via IP-protocols incorporating teachings of the present disclosure, the containers hosted on a networking device, the method comprising:

(S1) providing an application specification to the networking device, the application specification stating which containers have to be installed and started on a runtime system of the networking device, the application-specification further including tags indicating whether a container requires serial communication to perform an application described in the application specification, wherein the tags including the respective serial protocol;

(S2) assigning serial (e.g. physical) ports of the networking device to the containers used for serial communication;

(S3) starting a converting service in the operating system of the networking device to translate between the serial protocol and IP-protocol, wherein the converting service is configured to bind the respective serial ports and the respective IP port together for running in the runtime system;

(S4) configuring the application-specification with the assigned serial port and the respective IP-protocol; and (S5) restarting the applications or triggering the applications to read in the application-specification which IP-Port (e.g. "well-known" or registered port) is to be used to communicate via the serial communication link attached to a respective device.

The tags indicating whether a container requires serial communication to perform an application described in the application specification can be annotated to the application specification during engineering or by implementing the container. Tags are a sort of metadata, attributes, annotations, or flags indicating whether a container requires serial communication and/or indicating what protocol of serial communication is required. In some embodiments, the tags comprising information which protocol of serial communication is required.

IP-protocol comprises Internet Protocol and ICMP (Internet Control Message Protocol) and all protocols which are based on these protocols. For example, TCP, UDP, IPv4 or IPv6.

In the step (S4) "configuring the application-specification with the assigned serial port and the respective IP-protocol" the runtime configuration for the containers is set.

In the step (S5) "restarting the applications or triggering the applications to read in the application-specification (AS1-AS3) which IP-Port is to be used to communicate via the serial communication link attached to a respective device (D1-D5)" the changed configuration is injected into the applications by the run time system. The affected applications will read the configuration and reconfigure and restart if required.

In some embodiments, the containers are lightweight, the networking device can run several containers simultaneously.

The converting service for converting data between an IP-Port of the networking device and the serial communication link can be implemented as a protocol converter for translating and/or transforming data between IP-Protocols and serial interfaces, e.g. Modbus to IP or MSTP to IP.

In some embodiments, assigning of physical ports is performed by a user (e.g. engineer) by a suitable user interface. Based on the tags in the application-specification, the user interface is only providing containers which require serial communication.

In some embodiments, the method is implemented using suitable programming tools, programming languages, and container technology.

In some embodiments, the networking device is configured to provide OS-level virtualization for running containers in the operating system.

REFERENCE SIGNS

ND1, ND2 Networking Device
U User
C1-C5 Container
RS1, RS2 Runtime System
OS Operating System
UI1, UI2 User Interface
D1-D5 Device
COM1-COM5 Serial Interface
AS1-AS3 Application Specification CS1-CS3 Converting Service
S1-S5 Step

The invention claimed is:
1. A networking device configured to host containers to provide application services, the networking device comprising:
   an operating system to provide computing resources for the containers;
   a runtime system providing an environment to run the containers on the networking device; and
   a first container providing an application and/or a service for a device communicating with the network device, wherein the first container comprises an application-specification for the respective application or service, the application-specification indicating which containers have to be installed and started on the networking device to provide the respective application or service, wherein the application-specification includes tags to indicate if the first container requires a serial communication link to the device to provide the respective application and/or service to the device;
   wherein the operating system provides and hosts a service for converting data between an IP-Port of the networking device and the serial communication link to the device.

2. The networking device according to claim 1, further comprising an interface to assign physical ports of the device to the first container.

3. The networking device according to claim 2, wherein the interface comprises a local web UI.

4. The networking device according to claim 1, wherein the networking device comprises a controller, or a gateway, or an edge gateway.

5. The networking device according to claim 1, wherein the device comprises a controller, or an actuator, or a sensor.

6. The networking device according to claim 1, wherein the networking device is configured to provide OS-level virtualization for running containers in the operating system.

7. The networking device according to claim 1, wherein the service comprises a protocol converter for translating between IP-Protocols and serial interfaces.

8. A method for providing a serial communication link for containers configured to communicate via IP-protocols, the containers hosted on a networking device, the method comprising:
   providing an application specification to the networking device, the application specification indicating which containers have to be installed and started on a runtime system of the networking device, the application-specification further including tags indicating whether a particular container requires serial communication to perform an application described in the application specification, wherein the tags include the respective serial protocol;
   assigning serial ports of the networking device to the containers used for serial communication;
   starting a converting service in the operating system of the networking device to translate between the serial protocol and IP-protocol, wherein the converting service binds the respective serial ports and the respective IP port together for running in the runtime system;
   configuring the application-specification with the assigned serial port and the respective IP-protocol; and
   restarting the applications or triggering the applications to read in the application-specification which IP-Port is to be used to communicate via the serial communication link attached to a respective device.

9. The method according claim 8, wherein assigning of physical ports is performed by a user using a user interface.

10. The method according claim 8, wherein, based on the tags in the application-specification, the user interface is only providing containers which require serial communication.

11. The method according to claim 8, wherein the networking device provides OS-level virtualization for running containers in the operating system.

12. A tangible non-transitory computer-readable medium storing instructions which, when executed by a computer, cause the computer to:
   provide an application specification to the networking device, the application specification indicating which containers have to be installed and started on a runtime system of the networking device, the application-specification further including tags indicating whether a particular container requires serial communication to perform an application described in the application specification, wherein the tags include the respective serial protocol;
   assign serial ports of the networking device to the containers used for serial communication;
   start a converting service in the operating system of the networking device to translate between the serial protocol and IP-protocol, wherein the converting service binds the respective serial ports and the respective IP port together for running in the runtime system;
   configure the application-specification with the assigned serial port and the respective IP-protocol; and
   restart the applications or triggering the applications to read in the application-specification which IP-Port is to be used to communicate via the serial communication link attached to a respective device.

* * * * *